(12) United States Patent
Voit, II et al.

(10) Patent No.: US 7,377,848 B2
(45) Date of Patent: May 27, 2008

(54) FILTER PURGE CONTROL FOR HVAC VARIABLE AIR CIRCULATION SYSTEM

(75) Inventors: Hugh Richard Voit, II, Chicago, IL (US); Robert D. Doescher, Geneseo, IL (US); Alan G. Leupold, Plainfield, IL (US); Marvin D. Pepper, Lockport, IL (US)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 11/456,956

(22) Filed: Jul. 12, 2006

(65) Prior Publication Data

US 2008/0014856 A1   Jan. 17, 2008

(51) Int. Cl.
*B60H 3/06* (2006.01)
*B60H 1/00* (2006.01)
*B60H 1/26* (2006.01)

(52) U.S. Cl. .................. 454/158; 454/137; 296/190.09
(58) Field of Classification Search ................ 454/136, 454/137, 158; 296/190.09
See application file for complete search history.

(56) References Cited

U.S. PATENT DOCUMENTS

| | | | | |
|---|---|---|---|---|
| 2,573,419 A | * | 10/1951 | Wilson | 454/75 |
| 2,972,057 A | * | 2/1961 | Boehmer et al. | 307/10.1 |
| 3,370,439 A | * | 2/1968 | Rivard et al. | 62/419 |
| 3,405,281 A | * | 10/1968 | Wilson | 307/38 |
| 3,861,282 A | * | 1/1975 | Scherenberg et al. | 454/112 |
| 3,868,896 A | * | 3/1975 | Doll et al. | 454/137 |
| 4,072,487 A | * | 2/1978 | Irwin | 62/244 |
| 4,140,047 A | * | 2/1979 | Bowman et al. | 454/138 |
| 4,189,987 A | * | 2/1980 | Amberg et al. | 454/137 |
| 4,344,356 A | | 8/1982 | Casterton et al. | |
| 4,365,541 A | | 12/1982 | Marques et al. | |
| 4,467,706 A | | 8/1984 | Batcheller | |
| 4,482,367 A | | 11/1984 | Howeth | |
| 4,531,453 A | | 7/1985 | Warman et al. | |
| 4,658,598 A | * | 4/1987 | Schulz | 62/239 |
| 4,660,462 A | * | 4/1987 | Thompson et al. | 454/158 |
| 4,989,500 A | * | 2/1991 | Anliker et al. | 454/158 |
| 5,119,718 A | | 6/1992 | Wagner et al. | |
| 5,203,737 A | | 4/1993 | Joseph et al. | |
| 5,860,856 A | | 1/1999 | Teich et al. | |
| 5,921,619 A | * | 7/1999 | Cederberg et al. | 296/190.09 |
| 5,993,312 A | * | 11/1999 | Panoushek et al. | 460/1 |
| 6,263,685 B1 | * | 7/2001 | Strobel | 62/133 |
| 6,283,849 B1 | * | 9/2001 | Shields | 454/75 |

FOREIGN PATENT DOCUMENTS

EP        70636 A2  *  1/1983

* cited by examiner

*Primary Examiner*—Steven B. McAllister
*Assistant Examiner*—Patrick F O'Reilly, III
(74) *Attorney, Agent, or Firm*—Rebecca Henkel

(57) ABSTRACT

A variable air circulation system for the cab enclosure of an off-highway vehicle is disclosed and described. The system provides for adjustment of the ratio between fresh air circulation and recirculation of cab air. Fresh air is introduced into the cab through a fresh air inlet having a fresh air filter therein. The air inlet leads to a circulation conduit. When a cab door is opened, a valve to the conduit is opened. When the door is closed, the air pulse created in the cab is effective, through the valve, to dislodge dust and dirt from the filter.

27 Claims, 3 Drawing Sheets

FILTER PURGE CONTROL FOR HVAC VARIABLE AIR CIRCULATION SYSTEM

CROSS REFERENCE TO RELATED APPLICATIONS

This application is related to co-pending U.S. patent application Ser. No. 11/456,938 entitled "Filter Purge Control For HVAC Fixed Air Circulation System, filed simultaneously herewith on Jul. 12, 2006.

BACKGROUND OF THE INVENTION

This invention relates in general to off-highway vehicles. It relates particularly to the heating, ventilating and air conditioning (HVAC) system in an off-highway vehicle and, more particularly, to a purge control for the fresh air filter in the HVAC system for an off-highway vehicle.

Off-highway vehicles are often operated in extremely dusty environments. As a result, the HVAC systems for off-highway vehicle cabs must employ highly effective fresh air filters to remove dust and other particulate matter before it enters the cab. They frequently use what is known as fresh air filter purging to dislodge dust and other accumulated debris from the fresh air filter medium. Purging the filter causes dirt to be released from the inlet face of the filter medium, thus prolonging the filter service life.

Typically, an off-highway vehicle cab is equipped with one of two types of interior air recirculation systems. One is known as a fixed system and the other as a variable system.

In a variable system, the relative amounts of fresh air taken in and recirculated air can be varied, i.e., the ratio between fresh air circulation and recirculation of cab air can be adjusted. A variable recirculation system, in a minimum recirculation/maximum fresh air setting, provides the highest cab pressurization and the best dehumidification. When at the maximum recirculation/minimum fresh air setting, filter life is generally extended and the system provides the greatest potential heating and cooling. Modern cab heating and air conditioning systems equipped with Automatic Temperature Control (ATC) are capable of taking advantage of these characteristics and can automatically optimize the ratio of fresh air to recirculated air within the cab, depending on system settings made by the operator, cab temperature at the time and the ambient conditions encountered.

In a fixed system, no adjustment of the recirculation opening takes place. One type of fixed system is equipped with at least two blowers, one or more blowers dedicated to pressurizing the cab with outside air and one or more for recirculating air within the cab. A second type of fixed system utilizes one or more blowers, with each blower(s) both pressurizing the cab and recirculating the air within the cab.

In any of these systems, fresh air is introduced into the cab through a fresh air filter. In an effort to extend filter life, it is conventional to reverse the air flow direction through the fresh air filter to dislodge the accumulated dust and debris from the filter medium. One method of filter purging takes advantage of the air pressure pulse created inside the cab when the cab door is closed. The pressure pulse momentarily reverses the air flow through the filter, causing dust and dirt to be released from the filter.

With existing methods, the effectiveness of the purge is often less than ideal. Furthermore, the operator can experience some undesirable effects. The cabin pressure pulsation associated with the purge can be substantial and may cause operator discomfort. The same pulse also makes closing the cab door more difficult.

It would be a distinct advantage to provide a variable air circulation system that overcomes the above-noted shortcomings of the prior art.

SUMMARY OF THE INVENTION

It is an object of the invention to provide improved fresh air filter purging for the cab HVAC system in off-highway vehicles.

It is another object to provide a cab HVAC system for off-highway road vehicles that assures improved cab pressurization and a cleaner cab interior environment.

It is still another object to provide increased fresh air filter service life and reduced filter maintenance in the HVAC system for off-highway vehicle cabs.

It is yet another object to provide an off-highway vehicle HVAC system for an off-highway vehicle cab wherein cab pressure pulses are optimized, resulting in a more comfortable operator environment.

It is a further object to provide an off-highway vehicle HVAC system that reduces cab door closing effort while maintaining an effective filter purge.

The foregoing and other objects are realized in either variable or fixed cab air recirculation systems for off-highway vehicles. According to the invention, whether with a variable or fixed system, the fresh air filter is more effectively purged outwardly of the cab each time the cab door is closed.

It has been found that filter purging is most effective when air flow restriction between the interior of the cab and the fresh air filter is minimized. Minimum restriction is achieved only when all possible air flow paths from the cab interior to the fresh air filter are optimized. According to the invention, a new path containing a bypass valve, and possibly a bypass duct, is created in the case where a dedicated pressurizer exists. Depending upon the type of cab air system, the invention would automatically have one of the following devices adjusted whenever the cab door is open: the variable recirculation device (in the case of a system without a dedicated pressurizer) or the bypass valve (in the case of a system with a dedicated pressurizer). According to the invention, one or more of these devices is adjusted automatically to its "full open" position whenever the cab door is opened, and remains open until after the cab door is closed. After door closure, the bypass valve closes fully and the recirculation device (in the case of no dedicated pressurizer) resumes the appropriate fresh air/recirculated air setting for the current conditions.

Also according to the invention, a signal is sent to the variable recirculation device/bypass valve, with or without the intervention of an ATC system. The signal, which occurs whenever the cab door is open, temporarily sets the variable recirculation vents/bypass valve to the "full-open" position. This ensures maximum purge effect when the cab door is subsequently closed. The best source of this signal is a cab door-activated switch, such as a dome light switch. The recirculation vent/bypass valve could also be temporarily forced to "full-open" by a signal from other sources. These could include (but are not limited to) engine oil pressure, alternator voltage, hydraulic system pressure or engine speed. This temporary opening of the recirculation vent(s)/bypass valve for purging could also be accomplished by means entirely independent of the electrical system. These could include (but are not limited to) a mechanical linkage from the vent(s) directly to the cab door, seat suspension, park brake, or transmission control.

For additional purging benefit, according to the invention, the signal to open the variable recirculation device could also shut off the recirculation blower. Shutting off the recirculation blower stops the incoming air flow through the fresh air filter, further enhancing the purging effect.

The following applies to the type of fixed cab air recirculation system containing one or more blowers dedicated to pressurizing the cab. This type of fixed system may contain a duct between the fresh-air filter and the pressurizer blower ("fresh air duct"). This type of fixed system would incorporate a path directly from the cab interior to the fresh air duct. Depending on the shape and location of this duct, relative to that of the cab enclosure, the path could simply be comprised of two adjacent openings. One opening would be on the enclosure, while one would be in the fresh air duct.

An alternative would be to have a separate duct ("bypass duct") connecting the cab enclosure to the fresh air duct. In either case, air flow between the cab enclosure and the fresh air duct would be normally prevented by a valve ("bypass valve"). When a bypass duct exists, the bypass valve would be located within, or at either end of, said duct. Otherwise, the bypass valve would be located at or near to the adjacent openings. In either case, the bypass valve would automatically open when the cab is in the purge mode, i.e., when cab door is opened. The air pressure pulse created by the cab door closure causes air to flow through the bypass valve, into the fresh air duct, and onward through the fresh air filter. The bypass valve is triggered by the same purge control signal sources as is the variable recirculation device listed above (dome light, engine oil pressure, etc.). This signal can also shut off the pressurizer blower when in the purge mode. With this design, if the pressurizer blower is shut off when the cab door is opened, the recirculation blower continues to run and supply air flow to the heater and air conditioner evaporator core. This design has the additional advantage of reducing the possibility that the air conditioner evaporator fins freeze with condensate.

For a fixed cab air recirculation system containing no dedicated pressurizer blower, the purge control signal would simply shut off the blower(s) until after the cab door is closed to further enhance cab filter purging.

For increased purging effectiveness, compatible with any of these systems, the same signal could also open any or all of the air discharge louvers/vents.

These and other objects are obtained by providing a variable air circulation system for the cab enclosure of an off-highway vehicle. The system provides for adjustment of the ratio between fresh air circulation and recirculation of cab air. Fresh air is introduced into the cab through a fresh air inlet having a fresh air filter therein. The air inlet leads to a circulation conduit. When a cab door is opened, the recirculation vent is opened. When the door is closed, the air pulse created in the cab is effective, through the recirculation vent, to dislodge dust and dirt from the filter. The dust and dirt falls outside the cab.

BRIEF DESCRIPTION OF THE DRAWINGS

The invention, including its construction and method of operation, is illustrated more or less diagrammatically in the drawings, in which.

DESCRIPTION OF THE PREFERRED EMBODIMENTS

Figure 1:
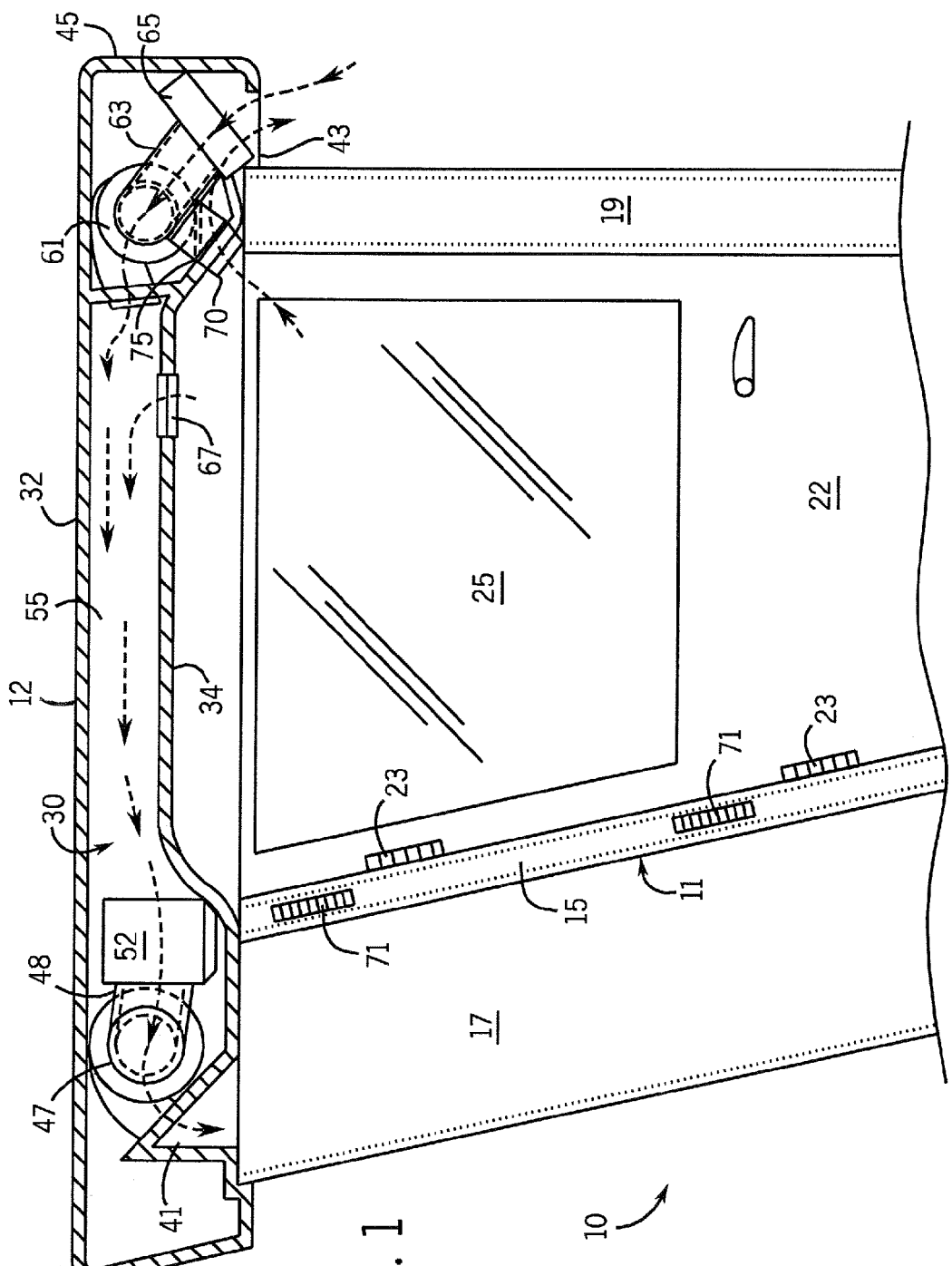
FIG. 1 is a schematic illustration of a fixed cab air HVAC system with dedicated pressurizer blower(s) for an off road vehicle cab incorporating an automatic cab air filter purge system embodying features of the invention.

Referring now to the drawings, and particularly to FIG. 1, the cab of an off-highway vehicle is seen generally at 10. The cab 10 comprises a cab body 11 including a roof 12 supported on a pair of cab front posts 15, between which a front windshield 17 is mounted. The roof 12 is supported at its back by cab rear posts 19.

Between front and rear cab posts 15 and 19 on at least one side of the cab body 11, is a cab access door 22. Access to the cab 10 for the operator is provided through the door 22, which is hinged at 23, and the door is normally closed to provide a substantially dust tight enclosure 25 for the operator.

Modern off-highway vehicles generally have HVAC systems. Such a system conventionally takes one of two forms; either a fixed fresh air/recirculated air system or a variable fresh air/recirculated air system. A fixed fresh air/recirculated air system may or may not be equipped with a dedicated pressurizer blower(s). The cab 10 illustrated in FIG. 1 depicts a fixed air system 30 with a dedicated pressurizer blower 61.

The fixed air system 30 in the cab 10 is mounted in the cab roof 12 between the outer roof shell 32 and the inner headliner 34. The system 30 distributes a combination of fresh air and recirculated air through a distribution plenum 41 over the windshield 17. It takes in fresh air through a fresh air inlet port 43 formed in the roof 12 under a rear overhang 45 of the roof. As one of skill in the art would understand, the inlet and outlet can be positioned in other locations, those shown in the figures being the most effective for a cab of the general design depicted.

The system 30 comprises a recirculation blower 47 mounted over the plenum 41; the blower 47 is connected by an air conduit 48 to a heating and air conditioning core housing 52 adjacent to the blower.

The heating and air conditioning core housing 52 is connected, through a main air conduit 55 in the roof 12 above the headliner 34, with the pressurizer blower 61. The pressurizer blower 61 is, in turn, connected by a fresh air duct 63 to the fresh air inlet port 43. Mounted over the inlet port 43, between it and the duct 63, is a cab fresh air filter 65.

In the headliner 34, connected to the conduit 55, is a recirculation air louver 67. Also, in the headliner 34, above the rear posts 19, is a fresh air bypass valve 70. According to the invention, the bypass valve 70 is opened and closed by a purge control 75 to place the enclosure 25 of the cab 10 in communication with the fresh air duct 63 and, as such, with the air filter 65.

Figure 3:
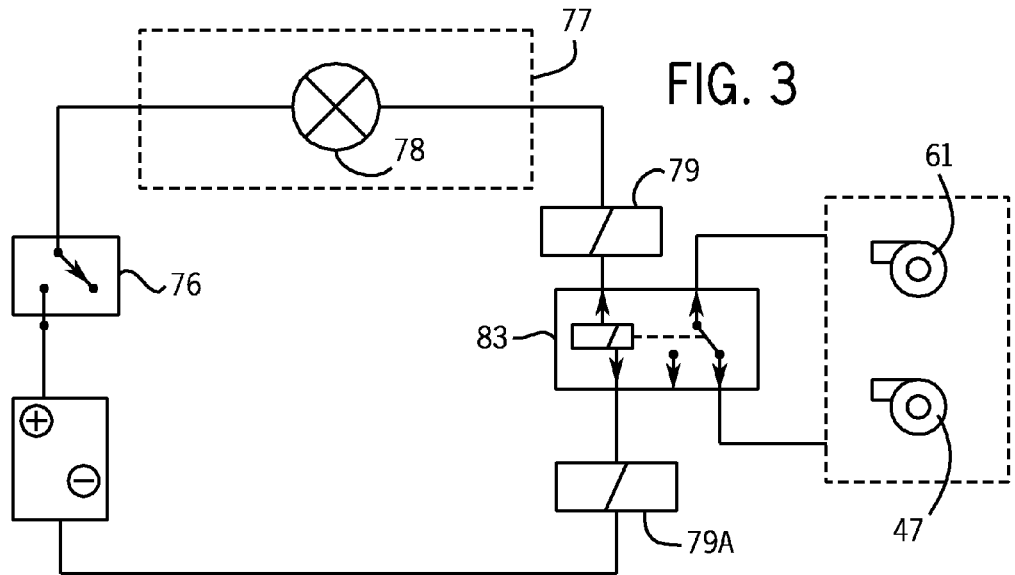
FIG. 3 is a schematic illustration of the purge control 75.

The purge control 75 includes, in the embodiment illustrated (see FIG. 3), a dome light circuit 77 in the cab enclosure 25. When the operator opens the door 22, a door-actuated switch 76 closes and current is directed to the dome light circuit 77, which includes a dome light 78. According to the invention, the dome light circuit 77 is also connected to an actuator 79 for the normally closed bypass valve 70. Opening of the cab door 22 causes, according to the invention, the actuator 79 to open the bypass valve 70.

The dome light circuit 77 is also connected to a relay 83 for the pressurizer blower 61. Current in the circuit 77 activates the relay 83, shutting off the blower 61. The recirculation blower 47 may continue to run so that the HVAC core receives air flow.

When the operator closes the door 22, an air pressure pulse is created in the enclosure 25. This causes air to flow through the by-pass valve 70 into the fresh air duct 63 and outwardly through the filter 65. Dust and dirt are dislodged outwardly. The dome light circuit 77 is subsequently opened, causing both the actuator 79 and the relay 83 to revert to their normal states. The result is a closing of the bypass valve 70 and resumption in operation of the blower 61. According to the invention, for this type of HVAC system, when the door 22 is opened, the purge control 75 may also open any or all air discharge louvers/vents 71.

Figure 2:
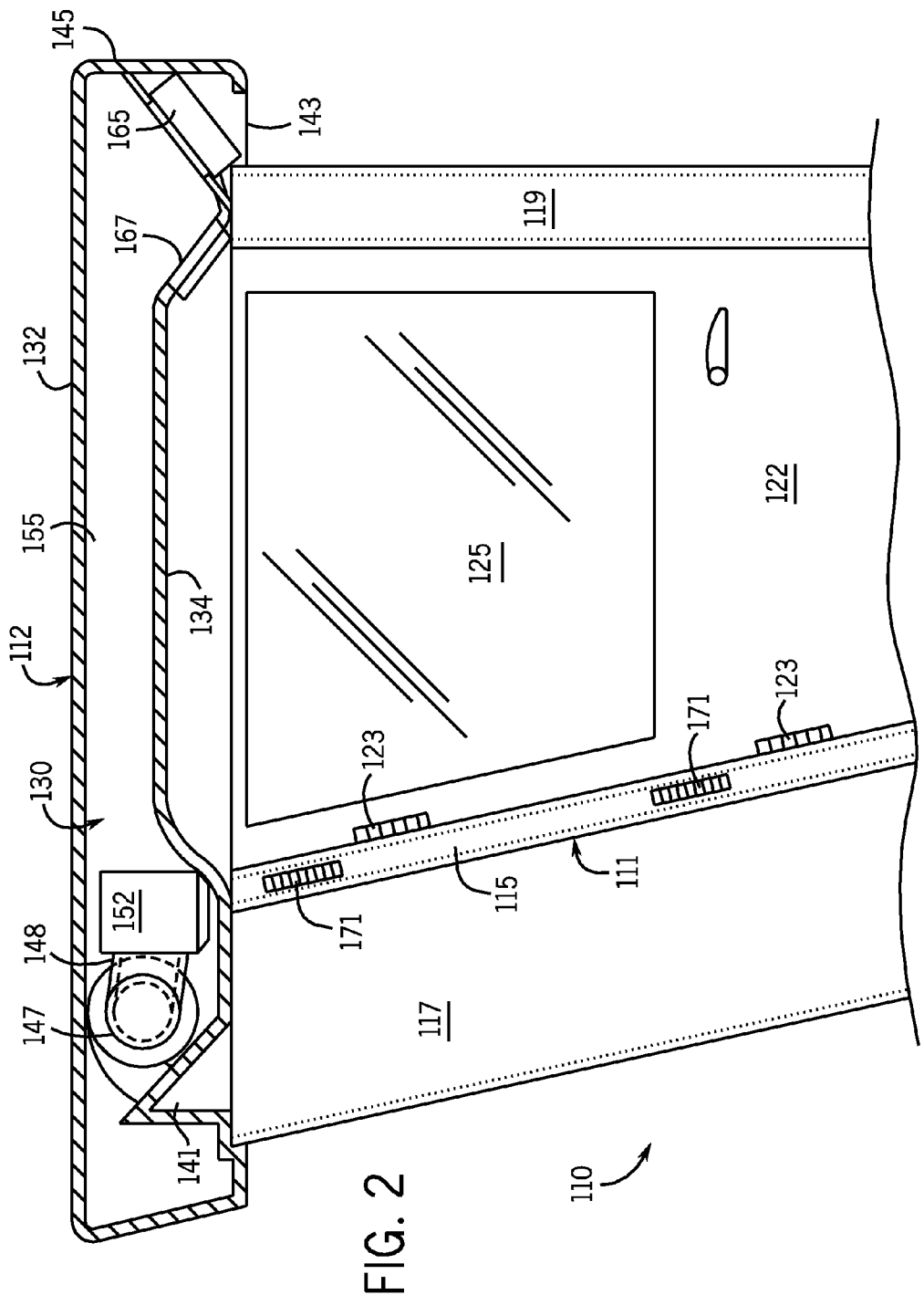
FIG. 2 is a schematic illustration of a variable or fixed cab air HVAC system without dedicated pressurizer blower(s) for an off road vehicle cab incorporating an automatic cab air filter purge system embodying features of the invention.

Referring now to FIG. 2, the cab of another off-highway vehicle is seen generally at 110. The cab 110 includes a body 111 having a roof 112 supported on a pair of cab front posts 115, between which a front windshield 117 is mounted. The roof 112 is supported at its back by cab rear posts 119. Between front and rear cab posts 115 and 119 is a cab access door 122. The door 122 is hinged at 123, and the door is normally closed to provide a substantially dust tight enclosure 125 for the operator.

The cab 110 illustrated in FIG. 2 is equipped with a variable or fixed air HVAC system 130, without a dedicated pressurizer blower. The variable air system 130 in the cab 110 is also mounted in the cab roof 112 between the outer roof shell 132 and the inner headliner 134. The system 130 distributes a combination of fresh air and recirculated air through a distribution plenum 141 over the windshield 117. It takes in fresh air through a fresh air inlet port 143 formed in the roof 112, under a rear overhang 145 of the roof.

The system 130 comprises a blower 147 mounted over the plenum 141. The blower 147 is connected by an air conduit 148 to a heating and air conditioning core housing 152 adjacent to the blower.

The heating and air conditioning core housing 152 is connected, through a main air conduit 155 in the roof 112 above the headliner 134, with the fresh air inlet port 143. Mounted over the inlet port 143, between it and the conduit 155, is a cab fresh air filter 165.

Figure 4:
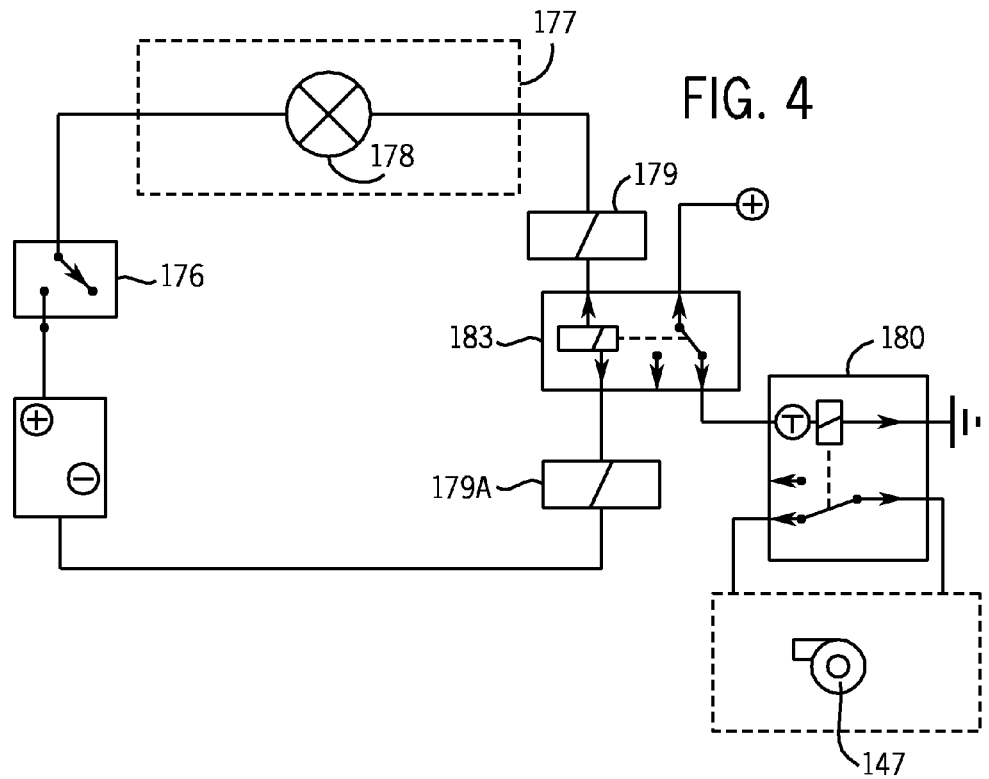
FIG. 4 is a schematic illustration of the purge control 175.

In the headliner 134, connected to the conduit 155, is a recirculation air louver 167. The louver 167 may be allowed to move incrementally between fully open and fully closed positions. This movement may be accomplished manually, or automatically by means of an electronic control system (e.g., an ATC system). In the latter case, the purge control (FIG. 4) may be a part of, or work closely with, the electronic control system.

When the HVAC system 130 is set for maximum recirculation/minimum fresh air, the fresh air filter 165 life is generally extended.

Both systems, fixed and variable, may use pressurization as described with reference to blower 61. Further, if used, the pressurization may be selectively activated or deactivated as an operational function of the controls. The inclusion or non-inclusion of an ATC is an additional variable that adds to the overall design flexibility afforded by the invention disclosed and claimed herein.

The purge control includes, in the embodiment illustrated (see FIG. 4), a dome light circuit 177 in the cab enclosure 125. When the operator opens the door 122, a door-actuated switch 176 closes and current is directed to the dome light circuit 177, which includes a dome light 178. According to the invention, for an HVAC system without dedicated pressurizer, this circuit is connected to an actuator 179 for the recirculation louver(s) 167. Opening the cab door 122 causes the actuator 179 to fully open the recirculation louver(s) 167, for as long as the door remains open. The signal may also, according to the invention, activate a relay 183, automatically shutting off the recirculation blower 147 until the cab door is again closed.

When the operator closes the door 122, an air pressure pulse is created in the enclosure 125. This causes air to flow through the recirculation louver(s) 167 and outwardly through the filter 165. Dust and dirt are dislodged outwardly. The dome light circuit 177 is subsequently opened, causing the actuator 179 and, optionally, the relay 183 to resume their normal states. The result is that the recirculation louver(s) 167 reverts to its normal setting, based on current cab conditions. If the blower 147 was shut off (optional), it now also resumes operation.

The drawings show optional additional actuators 79A and 179A which could be used to control second louvers or bypass valves in alternative system embodiments employing such second components. It is, however, possible to control more than one louver or bypass valve with a single actuator, such as 79 or 179.

According to the invention, for this type of HVAC system, when the door 122 is opened, the purge control may also automatically open any or all air discharge louvers/vents 171.

A time delay device 180 is provided to delay the time period between closure of the cab door and turning on the blower 147.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A variable air circulation system for an off-highway vehicle having a cab body, a generally dust-tight operator's enclosure and work station within said cab body, and a cab door pivotally mounted on said cab body and adapted to open and close said operator's enclosure to permit ingress thereto and egress therefrom, said circulation system comprising:

a distribution plenum for distributing a combination of fresh air and recirculated air into said operator's enclosure;

a heating and air conditioning core housing;

a fresh air inlet port through said cab body;

an air flow duct between said plenum and said fresh air inlet port, said core housing in said air flow duct;

a fresh air filter adjacent said fresh air inlet port, arranged such that air passing through said fresh air inlet port also passes through said filter;

a recirculation port between said operator's enclosure and said air flow duct;

a recirculation valve with a variable closure mechanism in said recirculation port controlling the amount of air flow through said recirculation port;

a recirculation blower in air flow communication with said plenum and said core housing, said recirculation blower, core housing, recirculation port, fresh air inlet port and air filter arranged such that said recirculation blower causes recirculated air from within said operator's enclosure to flow through said recirculation valve and recirculation port and fresh air from outside the cab to flow through said fresh air inlet port and air filter along said air flow duct where the fresh air mixes with the recirculated air, then through said core housing into said plenum and thence into said operator's enclosure;

a pressurizer blower in said air flow duct to increase the flow of air into said operator's enclosure;

a control device connected to said recirculation valve and a sensor, said sensor causing said recirculation valve to fully open when said sensor senses that said vehicle has been put into a rest, yet operative condition signaling that the operator is about to leave said operator's enclosure;

said control device also connected to said recirculation blower such that said recirculation blower is inactivated when said cab door is opened, and activated when said cab door is closed, whereby closing said cab door creates an air pressure pulse within the operator's enclosure, causing a reverse air flow through said air filter; and a time delay device to delay the time period between closure of said cab door and turning on of said recirculation blower.

2. The air circulation system of claim 1, wherein:
closing of said cab door further causes said recirculation valve to return to the position it was in prior to the opening of the cab door.

3. The air circulation system of claim 2, wherein:
said control device includes an electro-mechanical actuator connected to said recirculation valve, said actuator activated by electrical pulses generated by the opening and closing of said cab door.

4. The air circulation system of claim 3, wherein said control device further includes:
an automatic temperature control circuit controlling the components of said air circulation system to maintain the temperature set by the operator.

5. The air circulation system of claim 4, further including a time delay device to delay the time period between closure of said cab door and turning on of said recirculation blower, and wherein:
said recirculation valve is a louvered flow control valve.

6. A variable air circulation system for an off highway vehicle having a cab body, a generally dust-tight operator's enclosure and work station within said cab body, and a cab door pivotally mounted on said cab body and adapted to open and close said operator's enclosure to permit ingress thereto and egress therefrom, said circulation system comprising:
a distribution plenum for distributing a combination of fresh air and recirculated air into said operator's enclosure;
a fresh air inlet port through said cab body;
an air flow duct between said plenum and said fresh air inlet port, said core housing in said air flow duct;
a fresh air filter adjacent said fresh air inlet port, arranged such that air passing through said fresh air inlet port also passes through said filter;
a recirculation port between said operator's enclosure and said air flow duct;

a recirculation valve with a variable closure mechanism in said recirculation port controlling the amount of air flow through said recirculation port;

a recirculation blower in air flow communication with said plenum and said core housing, said recirculation blower, core housing, recirculation port, fresh air inlet port and air filter arranged such that said recirculation blower causes recirculated air from within said operator's enclosure to flow through said recirculation valve and recirculation port and fresh air from outside the cab to flow through said fresh air inlet port and air filter along an air flow duct where the fresh air mixes with the recirculated air, then through said core housing into said plenum and thence into said operator's enclosure;

a pressurizer blower in said air flow duct to increase the flow of air into said operator's enclosure;

a control device with an operator-selected temperature setting, said control device optimizing the ratio of fresh air and recirculated air flowing within the air circulation system to seek and maintain the temperature setting, said ratio controlled by the volume of recirculated air flowing through said recirculation valve;

said control device further connected to said recirculation valve and a sensor, said sensor causing said recirculation valve to open from a first position determined by said operator-selected temperature setting to a second fully open position when said sensor senses that said vehicle has been put into a rest, yet operative condition signaling that the operator is about to leave said operator's enclosure;

said control device also connected to said recirculation and pressurizer blowers such that said blowers are inactivated when said cab door is opened, and activated when said cab door is closed, and said recirculation valve returns to said first position, whereby closing said cab door creates an air pressure pulse within the operator's enclosure, causing a reverse air flow through said air filter.

7. The air circulation system of claim 6, wherein said control device further includes:
an automatic temperature control circuit controlling the components of said air circulation system to maintain the temperature set by the operator.

8. The air circulation system of claim 7, further including a time delay device to delay the time period between closure of said cab door and turning on of said recirculation blower, and wherein
when said cab door is closed said control device returns said recirculation valve to the opening size immediately prior to moving to fully open.

9. The air circulation system of claim 6, wherein:
said control device includes an electro-mechanical actuator connected to said recirculation valve, said actuator activated by electrical pulses generated by the opening and closing of said cab door.

10. The air circulation system of claim 9, wherein:
said recirculation valve is a louvered flow control valve.

11. In a variable air circulation system for an off highway vehicle having a cab body, generally dust-tight operator's enclosure and work station within said cab body, and a cab door pivotally mounted on said cab body and adapted to open and close said operator's enclosure to permit ingress thereto and egress therefrom, a distribution plenum for distributing a combination of fresh air and recirculated air into said operator's enclosure, a heating and air conditioning core housing, the improvement comprising:
a fresh air inlet port through said cab body;

an air flow duct between said plenum and said fresh air inlet port, said core housing in said air flow duct;

a fresh air filter adjacent said fresh air inlet port, arranged such that air passing through said fresh air inlet port also passes through said filter;

a recirculation port between said operator's enclosure and said air flow duct;

a recirculation valve with a variable closure mechanism in said recirculation port controlling the amount of air flow through said recirculation port;

a recirculation blower in air flow communication with said plenum and said core housing, said recirculation blower, core housing, recirculation port, fresh air inlet port and air filter arranged such that said recirculation blower causes recirculated air from within said operator's enclosure to flow through said recirculation valve and recirculation port and fresh air from outside the cab to flow through said fresh air inlet port and air filter along an air flow duct where the fresh air mixes with the recirculated air, then through said core housing into said plenum and thence into said operator's enclosure;

a control device with an operator-selected temperature setting, said control device optimizing the ratio of fresh air and recirculated air flowing within the air circulation system to seek and maintain the temperature setting, said ratio controlled by the volume of recirculated air flowing through said recirculation valve;

said control device further connected to said recirculation valve and a sensor, said sensor causing said recirculation valve to open from a first position determined by said operator-selected temperature setting to a second fully open position when said sensor senses that said vehicle has been put into a rest, yet operative condition signaling that the operator is about to leave said operator's enclosure;

said control device also connected to said recirculation blower such that said recirculation blower is inactivated when said cab door is opened, and activated when said cab door is closed, and said recirculation valve returns to said first position, whereby closing said cab door creates an air pressure pulse within the operator's enclosure, causing a reverse air flow through said air filter.

12. The air circulation system of claim 11, wherein said control device further includes:

an automatic temperature control circuit controlling the components of said air circulation system to maintain the temperature set by the operator.

13. The air circulation system of claim 12, wherein when said cab door is closed said control device returns said recirculation valve to the opening size immediately prior to moving to fully open.

14. The air circulation system of claim 13, further including a time delay device to delay the time period between closure of said cab door and turning on of said recirculation blower, and wherein:

closing of said cab door further causes said recirculation valve to return to the relative open position it was in prior to the opening of the cab door.

15. The air circulation system of claim 14, wherein:

said control device includes an electro-mechanical actuator connected to said recirculation valve, said actuator activated by electrical pulses generated by the opening and closing of said cab door.

16. The air circulation system of claim 15, wherein:

said recirculation valve is a louvered flow control valve.

17. A variable air circulation system for an off-highway vehicle having a cab body, a generally dust-tight operator's enclosure and work station within said cab body, and a cab door pivotally mounted on said cab body and adapted to open and close said operator's enclosure to permit ingress thereto and egress therefrom, said circulation system comprising:

a distribution plenum for distributing a combination of fresh air and recirculated air into said operator's enclosure;

a heating and air conditioning core housing;

a fresh air inlet port through said cab body;

an air flow duct between said plenum and said fresh air inlet port, said core housing in said air flow duct;

a fresh air filter adjacent said fresh air inlet port, arranged such that air passing through said fresh air inlet port also passes through said filter;

a recirculation port between said operator's enclosure and said air flow duct;

a recirculation valve with a variable closure mechanism in said recirculation port controlling the amount of air flow through said recirculation port;

a recirculation blower in air flow communication with said plenum and said core housing, said recirculation blower, core housing, recirculation port, fresh air inlet port and air filter arranged such that said recirculation blower causes recirculated air from within said operator's enclosure to flow through said recirculation valve and recirculation port and fresh air from outside the cab to flow through said fresh air inlet port and air filter along said air flow duct where the fresh air mixes with the recirculated air, then through said core housing into said plenum and thence into said operator's enclosure;

a control device connected to said recirculation valve and a sensor, said sensor causing said recirculation valve to fully open when said sensor senses that said vehicle has been put into a rest, yet operative condition signaling that the operator is about to leave said operator's enclosure, said control device including an automatic temperature control circuit controlling the components of said air circulation system to maintain the temperature set by the operator;

said control device also connected to said recirculation blower such that said recirculation blower is inactivated when said cab door is opened, and activated when said cab door is closed, whereby closing said cab door creates an air pressure pulse within the operator's enclosure, causing a reverse air flow through said air filter; and a time delay device to delay the time period between closure of said cab door and turning on of said recirculation blower.

18. The air circulation system of claim 17, further including:

a pressurizer blower system and wherein said control device is also connected to said pressurizer blower such that said recirculation and pressurizer blowers are both inactivated.

19. The air circulation system of claim 18, wherein:

closing of said cab door further causes said recirculation valve to return to the position it was in prior to the opening of the cab door.

20. The air circulation system of claim 19, wherein:

said control device includes an electro-mechanical actuator connected to said recirculation valve, said actuator activated by electrical pulses generated by the opening and closing of said cab door.

21. The air circulation system of claim 20, wherein said control device further includes:
an automatic temperature control circuit controlling the components of said air circulation system to maintain the temperature set by the operator.

22. The air circulation system of claim 21, wherein:
said recirculation valve is a louvered flow control valve.

23. The air circulation system of claim 17, wherein:
closing of said cab door further causes said recirculation valve to return to the position it was in prior to the opening of the cab door.

24. The air circulation system of claim 23, wherein:
said control device includes an electro-mechanical actuator connected to said recirculation valve, said actuator activated by electrical pulses generated by the opening and closing of said cab door.

25. The air circulation system of claim 24, further including a time delay device to delay the time period between closure of said cab door and turning on of said recirculation blower, and wherein said control device further includes:
an automatic temperature control circuit controlling the components of said air circulation system to maintain the temperature set by the operator.

26. The air circulation system of claim 25, wherein:
said recirculation valve is a louvered flow control valve.

27. A variable air circulation system for an off highway vehicle having a cab body, a generally dust-tight operator's enclosure and work station within said cab body, and a cab door pivotally mounted on said cab body and adapted to open and close said operator's enclosure to permit ingress thereto and egress therefrom, said circulation system comprising:
a distribution plenum for distributing a combination of fresh air and recirculated air into said operator's enclosure;
a heating and air conditioning core housing;
a fresh air inlet port through said cab body;
an air flow duct between said plenum and said fresh air inlet port, said core housing in said air flow duct;
a fresh air filter adjacent said fresh air inlet port, arranged such that air passing through said fresh air inlet port also passes through said filter;
a recirculation port between said operator's enclosure and said air flow duct;
a recirculation valve with a variable closure mechanism in said recirculation port controlling the amount of air flow through said recirculation port, wherein said recirculation valve is a louvered flow control valve;
a recirculation blower in air flow communication with said plenum and said core housing, said recirculation blower, core housing, recirculation port, fresh air inlet port and air filter arranged such that said recirculation blower causes recirculated air from within said operator's enclosure to flow through said recirculation valve and recirculation port and fresh air from outside the cab to flow through said fresh air inlet port and air filter along said air flow duct where the fresh air mixes with the recirculated air, then through said core housing into said plenum and thence into said operator's enclosure;
a control device connected to said recirculation valve and a sensor, said sensor causing said recirculation valve to fully open when said sensor senses that said vehicle has been put into a rest, yet operative condition signaling that the operator is about to leave said operator's enclosure; and
said control device also connected to said recirculation blower such that said recirulation blower is inactivated when said cab door is opened, and activated when said cab door is closed, whereby closing said cab door creates an air pressure pulse within the operator's enclosure, causing a reverse air flow through said air filter.

* * * * *